US012598594B2

(12) United States Patent
Wang et al.

(10) Patent No.: US 12,598,594 B2
(45) Date of Patent: Apr. 7, 2026

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 384 days.

(21) Appl. No.: 18/028,636

(22) PCT Filed: Sep. 29, 2020

(86) PCT No.: PCT/CN2020/119012
§ 371 (c)(1),
(2) Date: Mar. 27, 2023

(87) PCT Pub. No.: WO2022/067558
PCT Pub. Date: Apr. 7, 2022

(65) Prior Publication Data
US 2023/0371079 A1     Nov. 16, 2023

(51) Int. Cl.
*H04W 74/08*      (2024.01)
*H04W 72/00*      (2023.01)
(Continued)

(52) U.S. Cl.
CPC ....... *H04W 72/0453* (2013.01); *H04W 72/00* (2013.01); *H04W 74/0833* (2013.01)

(58) Field of Classification Search
CPC ......... H04W 72/0453; H04W 74/0833; H04W 72/23; Y02D 30/70
See application file for complete search history.

(56) References Cited

U.S. PATENT DOCUMENTS

| | | | |
|---|---|---|---|
| 2020/0196349 A1* | 6/2020 | He | H04W 72/1268 |
| 2022/0022247 A1* | 1/2022 | Agiwal | H04W 72/0453 |

(Continued)

FOREIGN PATENT DOCUMENTS

| | | |
|---|---|---|
| CN | 110856276 A | 2/2020 |
| WO | 2019/217829 A1 | 11/2019 |

(Continued)

OTHER PUBLICATIONS

"RACH based NR small data transmission", Qualcomm Incorporated, Aug. 17-18, 2020, 3GPP TSG-RAN WG2 Meeting #111e R2-2007540, 5 pages.

(Continued)

*Primary Examiner* — Brian D Nguyen
(74) *Attorney, Agent, or Firm* — Sughrue Mion, PLLC

(57)     ABSTRACT

Embodiments of the present disclosure relate to methods, devices and computer readable media for communication. A network device transmits, to a terminal device, a configuration of bandwidth part for transmission of uplink data in an inactive state, the configuration comprising a configured grant. When the terminal device decides to transmit the uplink data in the inactive state, the terminal device determines the configured grant from the configuration of bandwidth part, and transmits, in the inactive state, the uplink data to the network device based on the configured grant. In this way, configuration grant based small data transmission can be enhanced.

18 Claims, 9 Drawing Sheets

(51) Int. Cl.
_H04W 72/0453_ (2023.01)
_H04W 74/0833_ (2024.01)

(56) References Cited

U.S. PATENT DOCUMENTS

| | | | | |
|---|---|---|---|---|
| 2022/0417901 | A1* | 12/2022 | Lee | H04W 76/27 |
| 2023/0120407 | A1* | 4/2023 | Huang | H04W 76/19 |
| | | | | 370/329 |
| 2023/0156814 | A1* | 5/2023 | Mo | H04W 74/0833 |
| | | | | 370/329 |
| 2023/0171835 | A1* | 6/2023 | Fang | H04W 76/27 |
| | | | | 370/329 |
| 2023/0262688 | A1* | 8/2023 | Kiilerich Pratas | |
| | | | | H04W 72/1268 |
| | | | | 370/329 |
| 2023/0300944 | A1* | 9/2023 | Shi | H04W 76/38 |
| | | | | 370/329 |
| 2023/0328835 | A1* | 10/2023 | Wu | H04W 74/0833 |
| | | | | 370/329 |
| 2024/0224209 | A1* | 7/2024 | Lee | H04W 76/30 |

FOREIGN PATENT DOCUMENTS

| | | | |
|---|---|---|---|
| WO | 2020/067790 | A1 | 4/2020 |
| WO | 2020/092126 | A1 | 5/2020 |

OTHER PUBLICATIONS

"Small Data Transmission over pre-configured PUSCH resources", Nokia, Nokia Shanghai Bell, Aug. 2020, 3GPP TSG-RAN WG2 Meeting #111e R2-2007489, 5 pages.

International Search Report of PCT/CN2020/119012 dated Jun. 30, 2021 [PCT/ISA/210].

Written Opinion of PCT/CN2020/119012 dated Jun. 30, 2021 [PCT/ISA/237].

JP Office Action for Japanese Patent Application No. 2023-519572, mailed on Apr. 2, 2024 with English Translation.

Intel Corporation, "Further consideration on Configured UL grant enhancement", 3GPP TSG RAN WG2 #107 R2-1909552.

NEC, "Remaining issues on simultaneous use of CGRT and CGT", 3GPP TSG RAN WG2 #107 R2-1909663, Aug. 26-30, 2019.

CN Office Action for CN Application No. 202080103820.7, mailed on Nov. 23, 2024 with English Translation.

Huawei et al., "Feature lead summary on Support for transmission in preconfigured UL resources", 3GPP TSG RAN WG1 Meeting #94b R1-1811697, Oct. 8-12, 2018, p. 1-p. 13.

Sierra Wireless S.A., "Techniques for enabling NR small data transmissions in INACTIVE state", 3GPP TSG-RAN WG2 Meeting #111 electronic R2-2007953, Aug. 17-28, 2020, p. 1-p. 3.

* cited by examiner

100

120

110

700

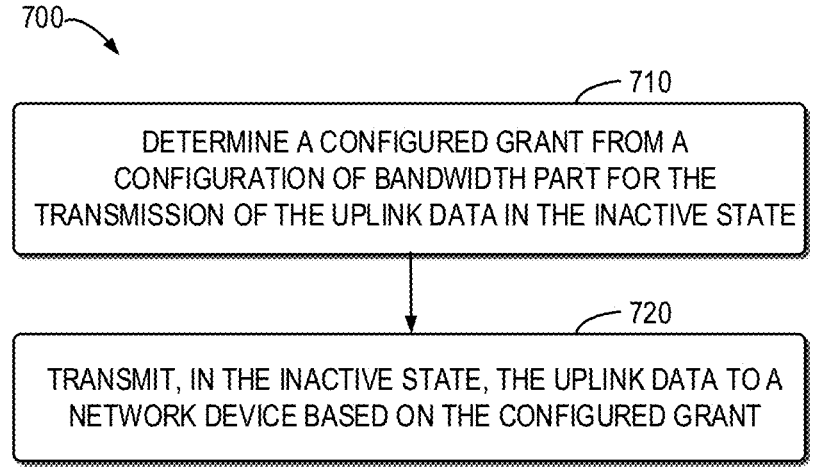

710

DETERMINE A CONFIGURED GRANT FROM A CONFIGURATION OF BANDWIDTH PART FOR THE TRANSMISSION OF THE UPLINK DATA IN THE INACTIVE STATE

720

TRANSMIT, IN THE INACTIVE STATE, THE UPLINK DATA TO A NETWORK DEVICE BASED ON THE CONFIGURED GRANT

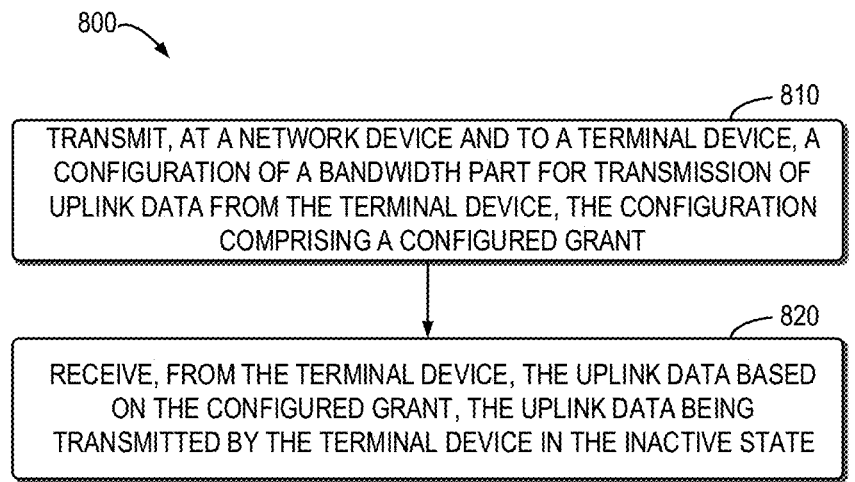

810

TRANSMIT, AT A NETWORK DEVICE AND TO A TERMINAL DEVICE, A CONFIGURATION OF A BANDWIDTH PART FOR TRANSMISSION OF UPLINK DATA FROM THE TERMINAL DEVICE, THE CONFIGURATION COMPRISING A CONFIGURED GRANT

820

RECEIVE, FROM THE TERMINAL DEVICE, THE UPLINK DATA BASED ON THE CONFIGURED GRANT, THE UPLINK DATA BEING TRANSMITTED BY THE TERMINAL DEVICE IN THE INACTIVE STATE

FIG. 8

METHOD, DEVICE AND COMPUTER STORAGE MEDIUM OF COMMUNICATION

CROSS REFERENCE TO RELATED APPLICATIONS

This application is a National Stage of International Application No. PCT/CN2020/119012 filed on Sep. 29, 2020.

TECHNICAL FIELD

Embodiments of the present disclosure generally relate to the field of telecommunication, and in particular, to methods, devices and computer storage media of communication for data transmission in an inactive state of a terminal device.

BACKGROUND

Typically, a terminal device in an inactive state may still have small and infrequent data traffic to be transmitted. Until the third generation partnership project (3GPP) Release 16, the inactive state cannot support data transmission, and the terminal device has to resume connection (i.e., enter a connected state) for any downlink and uplink data. This will result in unnecessary power consumption and signaling overhead.

In this event, 3GPP Release 17 has approved small data transmission (SDT) in the inactive state. Thereby, the signaling overhead can be reduced. In this case, how to perform SDT in the inactive state has become a hot issue.

SUMMARY

In general, embodiments of the present disclosure provide methods, devices and computer storage media for communication.

In a first aspect, there is provided a method of communication. The method comprises: in accordance with a determination that uplink data is to be transmitted in an inactive state, determining, at a terminal device, a configured grant from a configuration of bandwidth part for the transmission of the uplink data in the inactive state; and transmitting, in the inactive state, the uplink data to a network device based on the configured grant.

In a second aspect, there is provided a method of communication. The method comprises: transmitting, at a network device and to a terminal device, a configuration of a bandwidth part for transmission of uplink data from the terminal device, the configuration comprising a configured grant; and receiving, from the terminal device, the uplink data based on the configured grant, the uplink data being transmitted by the terminal device in the inactive state.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates an example method of communication implemented at a terminal device in accordance with some embodiments of the present disclosure;

FIG. 8 illustrates an example method of communication implemented at a network device in accordance with some embodiments of the present disclosure.

Throughout the drawings, the same or similar reference numerals represent the same or similar element.

DETAILED DESCRIPTION

Figure 1:
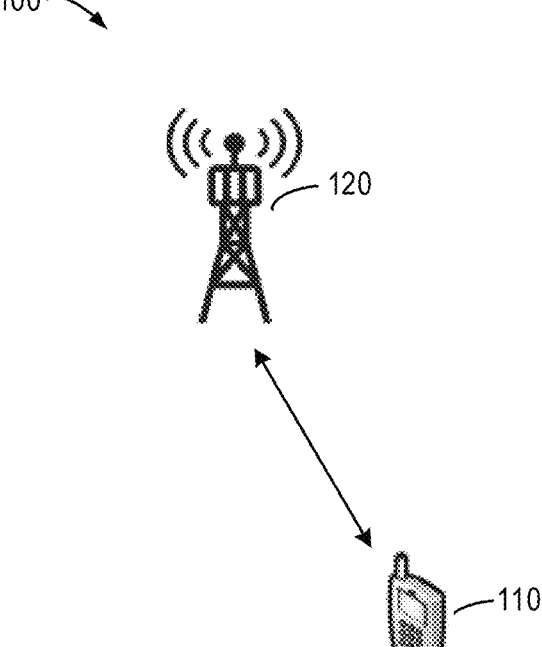
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Currently, there are various applications that involve exchange of small and infrequency data. For example, in some applications of mobile devices, SDT may include traffic from Instant Messaging (IM) services, heart-beat or keep-alive traffic, for example, from IM or email clients and other services, push notifications in various applications, traffic from wearables (including, for example, periodic positioning information), and/or the like. In some applications of non-mobile devices, SDT may include sensor data (e.g., temperature, pressure readings transmitted periodically or in an event-triggered manner in an IoT network), metering and alerting information sent from smart meters, and/or the like.

Traditionally, there are two schemes for transmitting using a pre-configured uplink resource (PUR), dedicated PUR and shared PUR. The shared PUR allows up to two users to transmit simultaneously and results in saving of transmission resources. In this case, it is highly concerned how to perform SDT with the PUR, especially for shared PUR.

Further, it has been agreed that RRC-less (i.e., SDT without RRC message) can be studied for CG with lower priority. In this case, how to support SDT for RRC-less also needs to be studied. In addition, the use of a contention-based PUR can result in significant saving of transmission resources. Thus, it is also concerned how to support the use of the contention-based PUR in SDT.

In view of this, embodiments of the present disclosure provide a solution for SDT based on a configured grant (CG) (also referred to as CG based SDT herein). The solution can achieve CG based SDT and also achieve contention resolution and backoff mechanisms for CG. Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a terminal device 110 and a network device 120. The terminal device 110 may be served by the network device 120. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the terminal device 110 may communicate with the network device 120 via a channel such as a wireless communication channel. The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some scenarios, when the terminal device 110 has small and infrequency data traffic to be transmitted, the terminal device 110 may perform CG based SDT. That is, the terminal device 110 may transmit uplink data to the network device 120 on a CG in an inactive state. In some embodiments, the CG may be a dedicated PUR. Of course, the CG may also be a shared PUR. In some embodiments, the shared PUR may be contention-free PUR. Of course, the shared PUR may be contention-based PUR. In some embodiments, the CG based SDT may be performed with RRC message. Of course, the CG based SDT may also be performed without RRC message.

Example Implementation of CG Based SDT

Figure 2A:
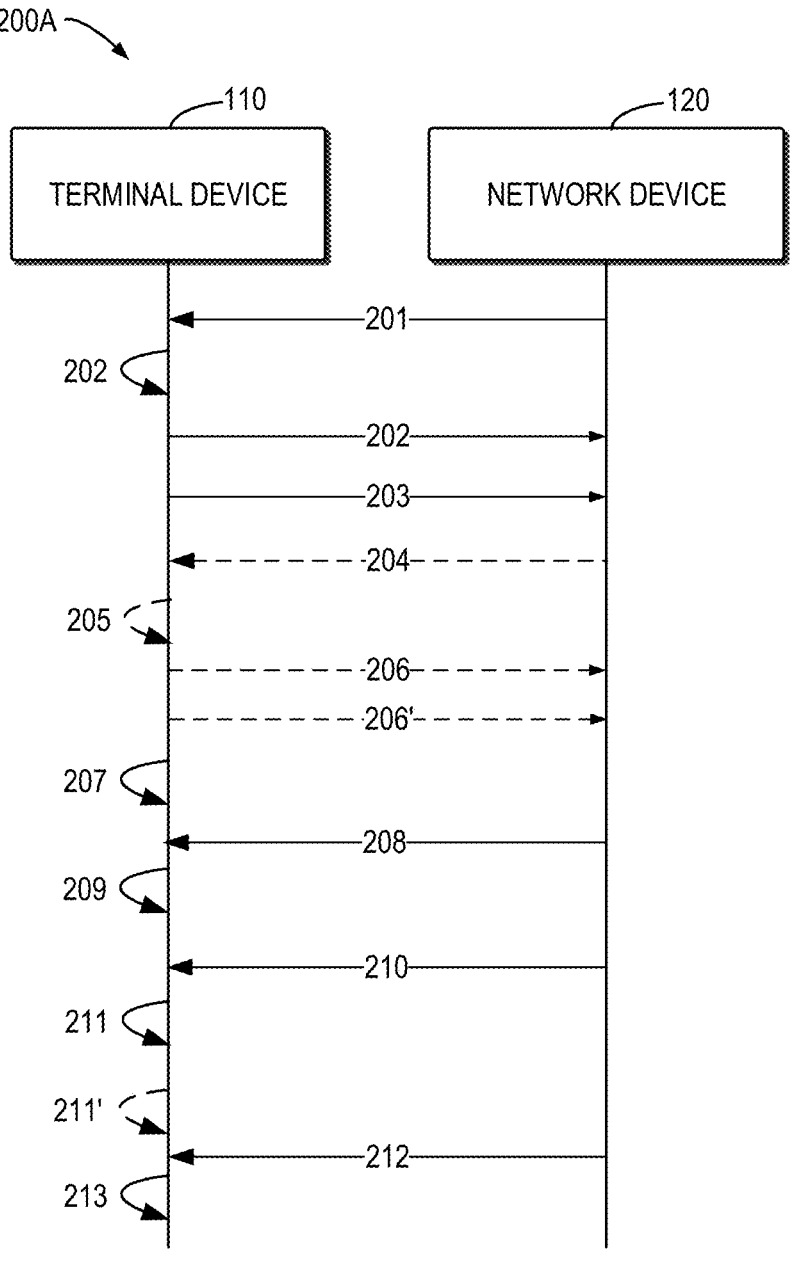
FIG. 2A illustrates a schematic diagram illustrating a process for communication during CG based SDT according to embodiments of the present disclosure.

In view of this, embodiments of the present application provide improve solutions for communication to support CG based SDT. It will be described below with reference to FIGS. 2A to 2C. FIG. 2A illustrates a schematic diagram illustrating a process 200A for communication during CG based SDT according to embodiments of the present disclosure. For the purpose of discussion, the process 200A will be described with reference to FIG. 1. The process 200A may involve the terminal device 110 and the network device 120 as illustrated in FIG. 1.

As shown in FIG. 2A, the network device 120 may transmit 201 a configuration of bandwidth part (BWP) to the terminal device 110. The BWP configuration is dedicatedly configured for SDT. In some embodiments, the BWP configuration comprises a CG for SDT. In some embodiments, the BWP is different from an initial BWP. In this way, traffic load of the initial BWP can be alleviated.

In some embodiments, the network device 120 may transmit the BWP configuration in a dedicated message. For example, in some embodiments, the BWP configuration may comprise a dedicated CG. In these embodiments, the BWP configuration may be provided to the terminal device 110 dedicatedly when the terminal device 110 is in a connected state. Alternatively, the BWP configuration may be provided to the terminal device 110 dedicatedly upon placing the terminal device 110 into an inactive state. In this case, dedicated CG based SDT can be performed on the BWP other than the initial BWP. Thus, the dedicated CG based SDT can be configured at the BWP other than the initial BWP.

Alternatively, the network device 120 may transmit the BWP configuration in system information. For example, in some embodiments, the BWP configuration may comprise a shared CG. In these embodiments, the BWP configuration may be provided to the terminal device 110 in the system information. In this case, shared CG based SDT can be performed on the BWP other than the initial BWP. Alternatively, for shared CG based SDT, the network device 120 may broadcast another one or more dedicated BWPs with CG resource other than the initial BWP which can be used for SDT.

In some embodiments, the BWP configuration for SDT may comprise a set of candidates for the CG. For example, multiple CG resources with different grant size/periodicity can be configured. In this way, at least for the shared CG, the terminal device 110 is allowed to select one of the CG resources to perform SDT.

When the terminal device 110 has uplink data to be transmitted and decides to transmit the uplink data in the inactive state, the terminal device 110 may determine 202 a CG from the BWP configuration. In some embodiments where the BWP configuration comprises a set of candidates for the CG, the terminal device 110 may select the CG from the set of candidates based on a packet size associated with the uplink data. As another example, the terminal device 110 may select the CG from the set of candidates based on a traffic pattern associated with the uplink data.

Upon determination of the CG, the terminal device 110 transmits 203 the uplink data to the network device 120 in the inactive state based on the CG. In some embodiments, the CG based SDT can be triggered if the terminal device 110 has valid timing advance (TA) for the serving cell of the network device 120.

In this way, CG based SDT can be performed on SDT specific BWP.

In some embodiments, the SDT can be performed with a radio resource control (RRC) message. For example, uplink data for the SDT may be transmitted together with RRCResumeRequest or RRCResumeRequest1 message. As another example, downlink data for the SDT may be transmitted together with a RRC message such as RRCRelease message and a TA command MAC CE.

In some alternative embodiments, the SDT can be performed without a RRC message, i.e., RRC-less. For example, for dedicated CG based SDT, uplink data may be transmitted directly on the dedicated CG resource configured to the terminal device 110. As another example, uplink data may be transmitted together with a MAC CE containing information of the terminal device 110. For example, the information of the terminal device 110 may be an inactive radio network temporary identifier (I-RNTI). Of course, the information may also be a short resume shortMAC_I. In some embodiments, downlink data may be transmitted together with one or more MAC CEs containing at least one of contention resolution identity, a TA command or a cell radio network temporary identifier (C-RNTI).

Figure 3:
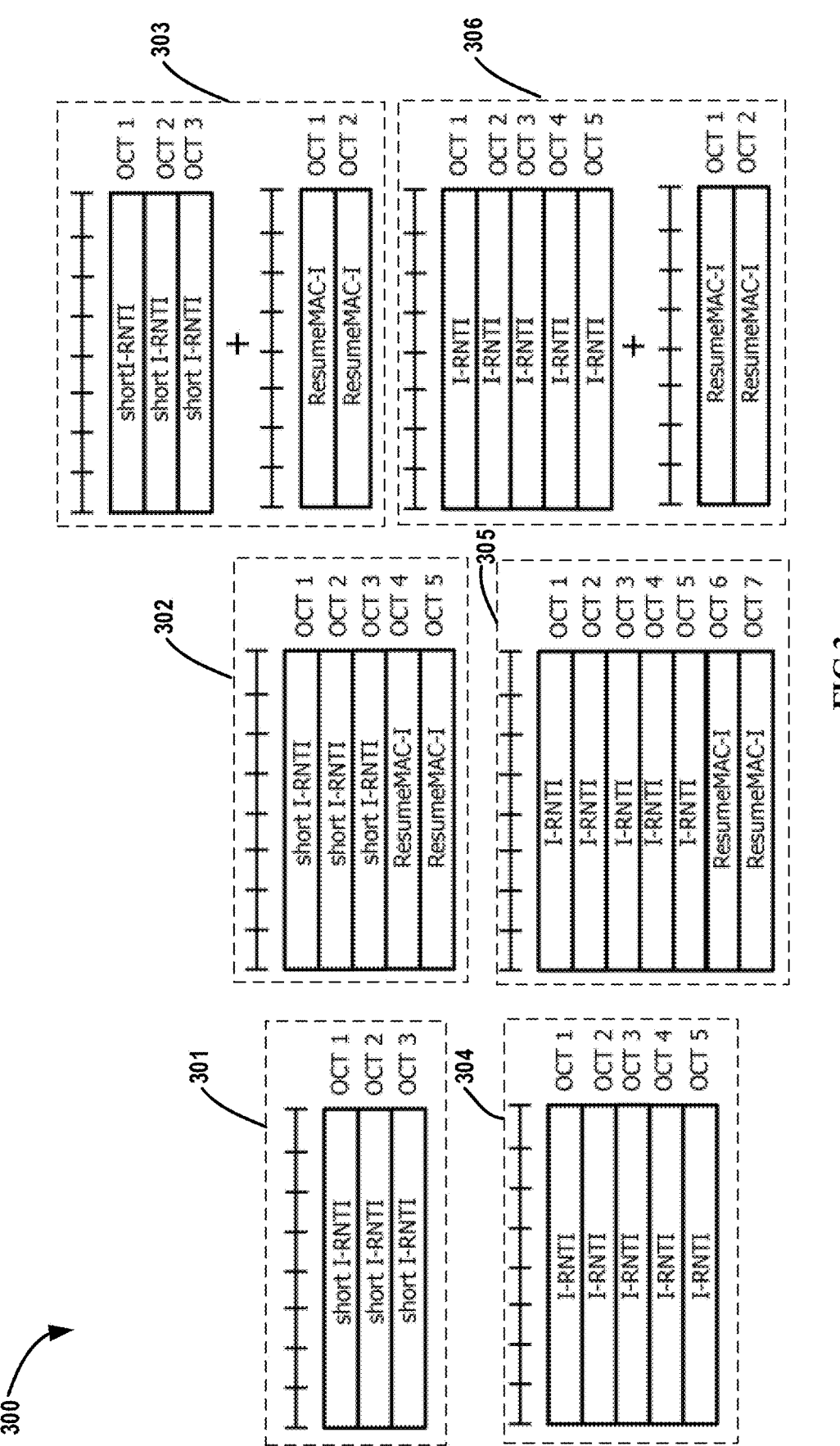
FIG. 3 illustrates a schematic diagram illustrating a medium access control element (MAC CE) for CG based SDT according to embodiments of the present disclosure.

In some embodiments, the RRC layer of the terminal device 110 may always provide to the MAC layer a short I-RNTI value (24 bits) considering that the CG based SDT usually happens on the network device 120 with a context of the terminal device 110. FIG. 3 illustrates a schematic diagram 300 illustrating a MAC CE for CG based SDT according to embodiments of the present disclosure. In some embodiments, the MAC CE may comprise short I-RNTI, as shown by a MAC CE 301 of FIG. 3. In some embodiments, the MAC CE may further comprise ResumeMAC-I, as shown by a MAC CE 302 of FIG. 3. Alternatively, the ResumeMAC-I and the short I-RNTI may be comprised in two separate MAC CEs, as denoted by reference sign 303 of the FIG. 3.

In some embodiments, the network device 120 may indicate 204 to the terminal device 110 whether a full I-RNTI is to be used. If the network device 120 indicates not to use the full I-RNTI, the RRC layer of the terminal device 110 may provide 205 to the MAC layer the short I-RNTI value (24 bits) and transmit 206 a MAC CE (also referred to as a second MAC CE herein) comprising the short I-RNTI to the network device 120. If the network device 120 indicates to use the full I-RNTI, the RRC layer of the terminal device 110 may provide to the MAC layer the full I-RNTI value (40 bits) and transmit 206' a MAC CE (also referred to as a first MAC CE herein) comprising the full I-RNTI to the network device 120. In some embodiments, the MAC CE may comprise a full I-RNTI, as shown by a MAC CE 304 of FIG. 3. In some embodiments, the MAC CE may further comprise ResumeMAC-I, as shown by a MAC CE 305 of FIG. 3. Alternatively, the ResumeMAC-I and the full I-RNTI may be comprised in two separate MAC CEs, as denoted by reference sign 306 of the FIG. 3.

In this way, MAC CE design is provided for RRC-less CG based SDT.

After the uplink CG based SDT transmission, the terminal device 110 may monitor a downlink control channel such as a physical downlink control channel (PDCCH) under the control of a timer (also referred to as a first timer herein). In some embodiments, the terminal device 110 may start 207 the first timer upon the transmission of the uplink data. In some embodiments, the terminal device 110 may only monitor PDCCH addressed to the CG based SDT RNTI while the first timer is running. For example, the terminal device 110 may only monitor PDCCH addressed to a new RNTI for CG based SDT or reused CS-RNTI for CG based SDT or reuse C-RNTI of the UE when it was under Connected state.

In some embodiments, the terminal device 110 may reuse a CG transmission timer as the first timer. Of course, the terminal device 110 may introduce a new timer as the first timer.

In some embodiments, the network device 120 may transmit 208 a scheduling for retransmission of the CG based SDT to the terminal device 110. For example, the scheduling for retransmission may be transmitted by uplink grant addressed to the CG based SDT RNTI. In these embodiments, the terminal device 110 may restart 209 the first timer in response to receiving the scheduling for retransmission.

In some embodiments, the network device 120 may transmit 210, to the terminal device 120, an indication indicating whether the SDT is successful or failed upon expiration of the first timer. In this case, if the indication indicates that the transmission is successful upon expiration of the first timer, the terminal device 110 may determine 211 that the SDT is successful upon expiration of the first timer. For example, this may be applied for dedicated CG based SDT. If the indication indicates that the SDT is failed upon expiration of the first timer, the terminal device 110 may determine 211' that the SDT is failed upon expiration of the first timer. For example, this may be applied for dedicated CG based SDT and shared CG based SDT.

In some embodiments, the network device 120 may transmit 212 a MAC PDU indicating that the uplink data is transmitted successfully. Upon receipt of the MAC PDU, the terminal device 110 may stop 213 the first timer. For example, for dedicated CG based SDT, if PDCCH transmission is addressed to its CG based SDT RNTI and the MAC PDU is successfully decoded, the terminal device 110 may stop the first timer. In this case, the terminal device 110 may consider that CG based SDT is successful and indicate to the upper layer that the CG based SDT was successful.

In this way, UE behavior for PDCCH monitoring after CG based SDT is provided.

Example Implementation of CG Based SDT With Contention Resolution

Figure 2B:
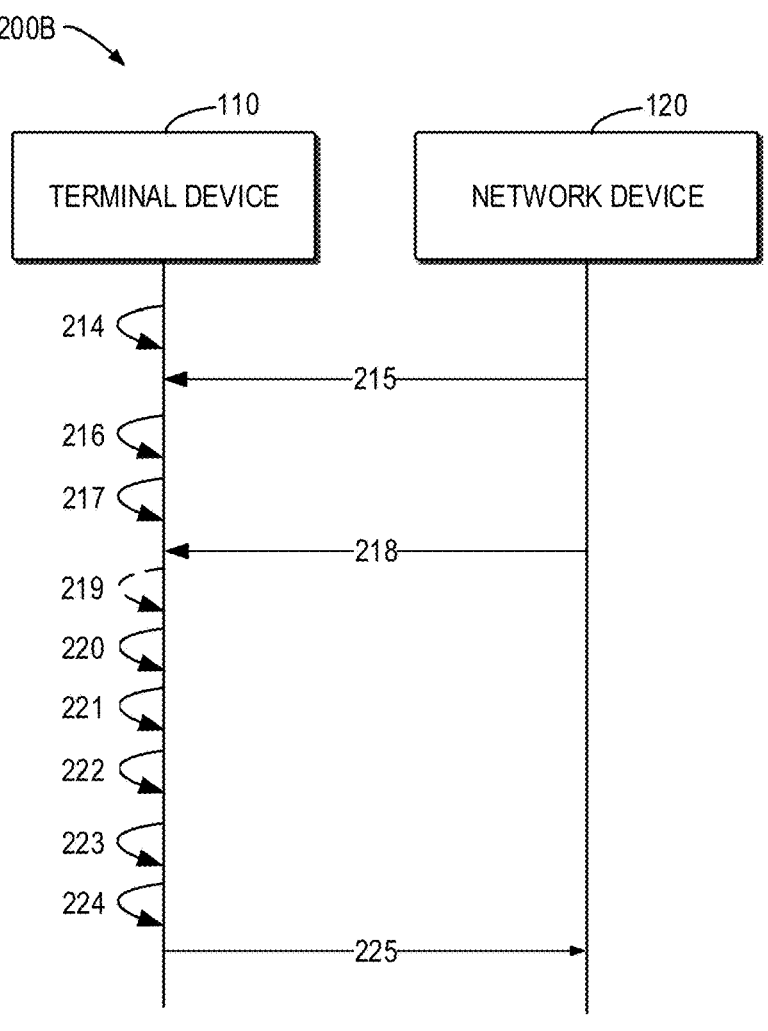
FIG. 2B illustrates a schematic diagram illustrating a process for communication during CG based SDT under a contention resolution mechanism according to embodiments of the present disclosure.

In case of multiple terminal devices use the same CG for SDT, a contention resolution will be needed. It will be described with reference to FIG. 2B. FIG. 2B illustrates a schematic diagram illustrating a process 200B for communication during CG based SDT under a contention resolution mechanism according to embodiments of the present disclosure. For the purpose of discussion, the process 200B will be described with reference to FIG. 1. The process 200B may involve the terminal device 110 and the network device 120 as illustrated in FIG. 1.

As shown in FIG. 2B, the terminal device 110 may start 214 a timer (also referred to as a second timer herein) for a contention resolution upon the transmission of the uplink data. In this way, after each CG transmission, a timer can be started for a contention resolution.

In some embodiments, the second timer may be the same as the first timer. Of course, the second timer may be a separate timer.

In some embodiments, the network device 120 may transmit 215 a scheduling for retransmission of the CG based SDT to the terminal device 110. For example, the scheduling for retransmission may be transmitted by uplink grant addressed to the CG based SDT RNTI. In these embodiments, the terminal device 110 may restart 216 the second timer in response to receiving the scheduling for retransmission.

In some embodiments, if the second timer expires, the terminal device 110 may determine 217 that the contention resolution is unsuccessful.

In some embodiments, the network device 120 may transmit 218 a MAC PDU to the terminal device 110 while the second timer is running. In some embodiments, the terminal device 110 may stop 219 the second timer upon receipt of a MAC PDU. For example, if a MAC PDU is received and the MAC PDU is successfully decoded, the terminal device 110 may stop the second timer. Of course, the terminal device 110 may also not stop the second timer upon receipt of the MAC PDU.

In some embodiments, upon receipt of the MAC PDU, the terminal device 110 may determine 220 whether the MAC PDU comprises a first identity associated with the contention resolution. For example, the terminal device 110 may determine whether the MAC PDU comprises a MAC CE for Contention Resolution Identity. If the MAC PDU comprises the first identity, the terminal device 110 may determine 221 whether the first identity matches a second identity of the terminal device 110 in the transmission of the uplink data. For example, the terminal device 110 may determine whether the UE content in the MAC CE matches the UE ID information such as I-RNTI in uplink transmission. In some embodiments, the UE Contention Resolution Identity MAC CE for random access procedure can be reused.

In case of CG based SDT with a RRC message, the MAC CE may comprise all or part of the UL CCCH SDU. In case of CG based SDT without a RRC message, the MAC CE may comprise all or part of the information in the UL MAC CE with UE ID information such as I-RNTI.

If the first identify matches the second identity, the terminal device 110 may determine 222 that the contention resolution is successful. Accordingly, the terminal device 110 may determine that the CG based SDT is successful. In this case, if the terminal device 110 receives TA command in the MAC PDU, the terminal device 110 may perform 223 the TA command. In some embodiments, the terminal device 110 may also receive, in the MAC PDU, a C-RNTI for used by the terminal device 110. In some embodiments, one or more of the first identity, the TA command and the C-RNTI may be comprised in a single MAC CE. Of course, the first identity, the TA command and the C-RNTI may also be comprised in separate MAC CEs.

If the first identify mismatches the second identity, the terminal device 110 may determine 224 that the contention resolution is unsuccessful. In these embodiments, the terminal device 110 may discard the MAC PDU. In this case, the terminal device 110 may discard the TA command the C-RNTI if present.

In some embodiments, if determining that the contention resolution is unsuccessful, the terminal device 110 may determine that the CG based SDT is unsuccessful. For example, the terminal device 110 may indicate to the upper layer that the CG based SDT is unsuccessful.

In some alternative embodiments, if the terminal device 110 determines that the contention resolution is unsuccessful, the terminal device 110 may perform 225 retransmission of the CG based SDT, and restart the second timer. The terminal device 110 may increment the number of CG transmissions, and if the number of CG transmissions is equal to a predetermined number, the terminal device 110 may determine that the CG based SDT is unsuccessful.

Example Implementation of CG Based SDT with Backoff Mechanism

Figure 2C:
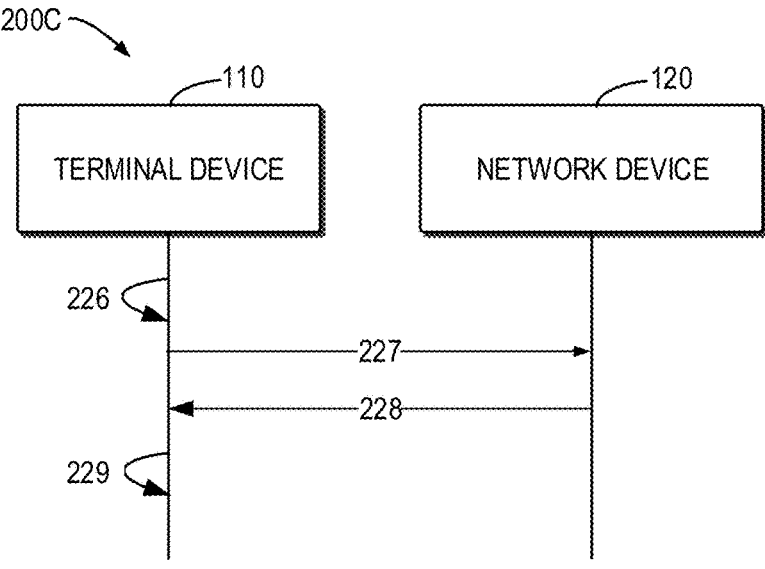
FIG. 2C illustrates a schematic diagram illustrating a process for communication during CG based SDT under a backoff mechanism in case of contention between terminal devices according to embodiments of the present disclosure.

To avoid occurring further contention, when the terminal device 110 determines that the contention resolution is unsuccessful, the terminal device 110 may start a timer during which the CG based SDT on the corresponding CG resource is not allowed. It will be described below with reference to FIG. 2C. FIG. 2C illustrates a schematic diagram illustrating a process 200C for communication during CG based SDT under a backoff mechanism according to embodiments of the present disclosure. For the purpose of discussion, the process 200C will be described with reference to FIG. 1. The process 200C may involve the terminal device 110 and the network device 120 as illustrated in FIG. 1.

As shown in FIG. 2C, the terminal device 110 may start 226 a timer (also referred to as a third timer herein) during which the CG based SDT on the corresponding CG resource is not allowed. That is, the terminal device 110 may suspend the transmission of the uplink data on the corresponding CG resource until the third timer expires. The terminal device 110 may perform 227 the SDT based on corresponding CG resource in the inactive state after the third timer expires. In some embodiments, the terminal device 110 may retransmit data packets associated with the uplink data to the network device 120 on the corresponding CG resource. In some embodiments, the terminal device 110 may continue to transmit new data packets associated with the uplink data to the network device 120 on the corresponding CG resource.

As to a duration of the third timer, the network device 120 may transmit 228 an indicator (also referred to as a backoff indicator herein) for the duration of the third timer. In some embodiments, the network device 120 may preconfigure the indicator to the terminal device 110 in a RRC message. In some alternative embodiments, the network device 120 may transmit the indicator in a MAC PDU.

Figure 4:
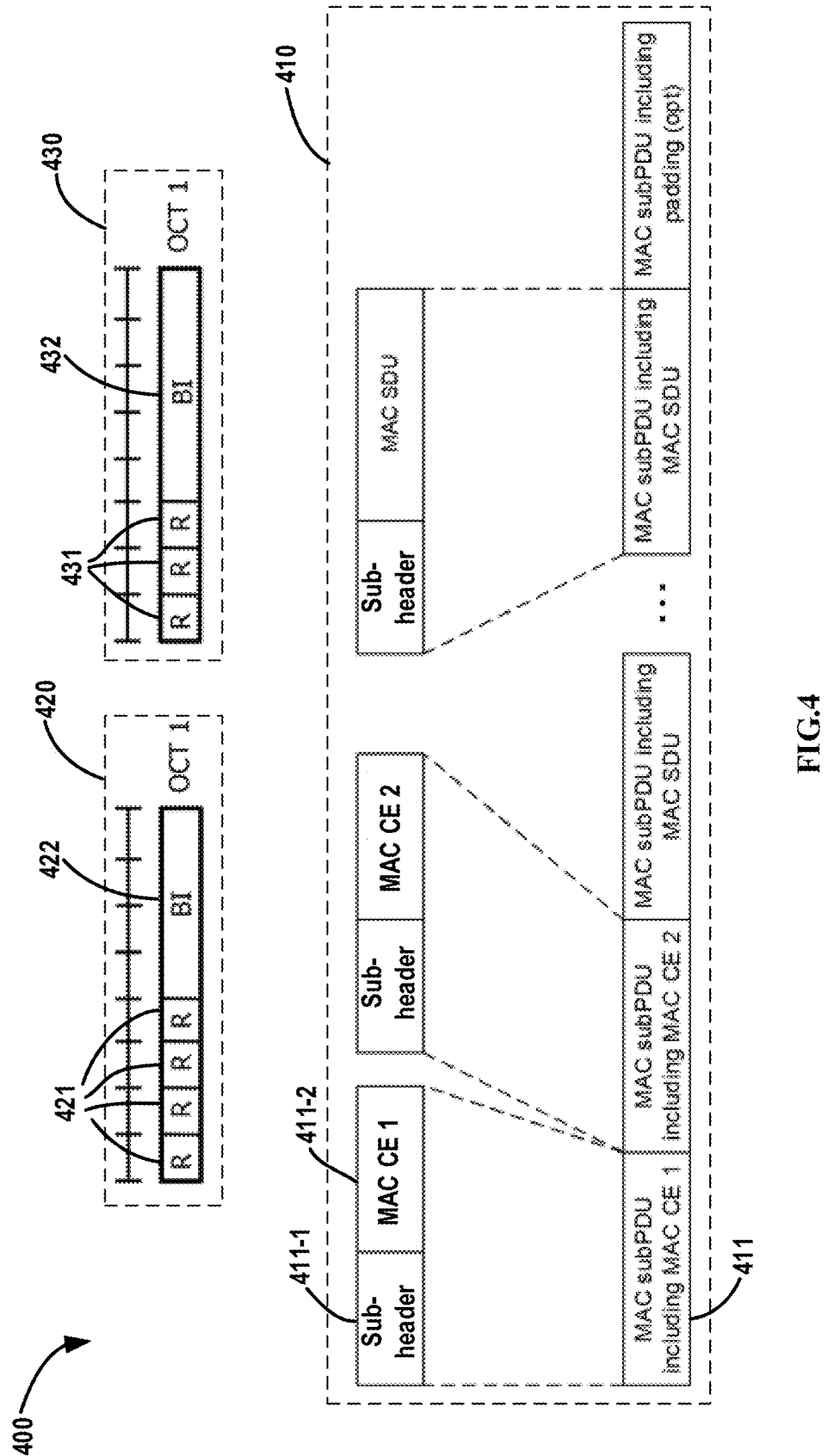
FIG. 4 illustrates a schematic diagram illustrating a medium access control protocol data unit (MAC PDU) for CG based SDT according to embodiments of the present disclosure.

In some embodiments, the MAC PDU may comprise a header comprising a logic channel identity (LCID) and a MAC CE carrying the indicator. In this way, current DL MAC PDU format can be used. FIG. 4 illustrates a schematic diagram 400 illustrating a MAC PDU for CG based SDT according to embodiments of the present disclosure. As shown in FIG. 4, reference sign 410 denotes an example of an MAC PDU. The MAC PDU may comprise MAC sub-PDU 411, and the MAC subPDU 411 may comprise a subheader (also referred to a header herein) 411-1 and a MAC CE 411-2. The header 411-1 may comprise LCID for the indicator for the CG based SDT, and the MAC CE 411-2 may comprise the indicator. Reference sign 420 denotes an example of the MAC CE carrying 4 bits backoff indicator, where R fields 421 denote reserved bits and BI field 422 denotes the backoff indicator. Reference sign 430 denotes an example of the MAC CE carrying 5 bits backoff indicator, where R fields 431 denote reserved bits and BI field 432 denotes the backoff indicator.

Figure 5:
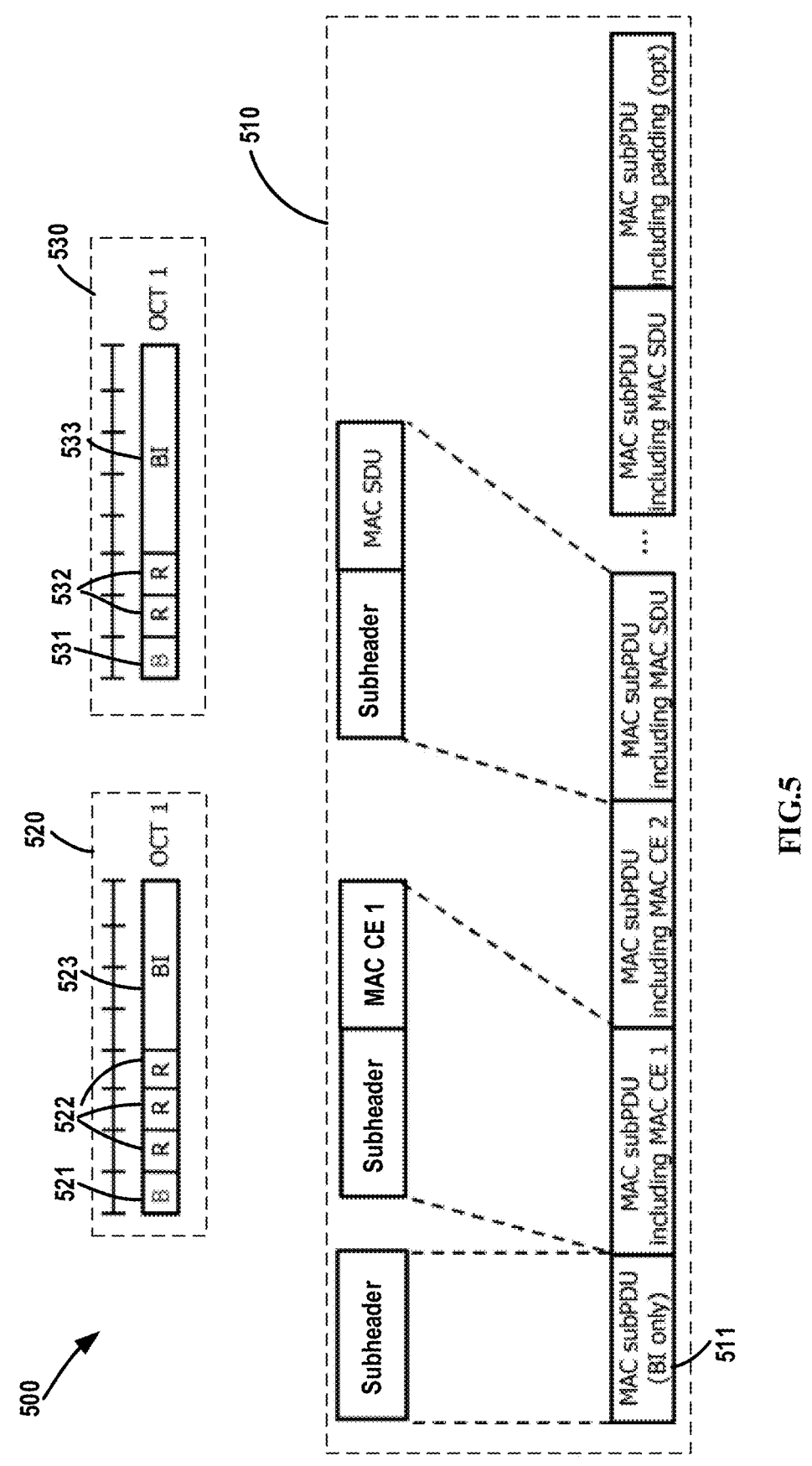
FIG. 5 illustrates a schematic diagram illustrating a MAC PDU for CG based SDT according to embodiments of the present disclosure.

In some alternative embodiments, the MAC PDU may comprise a header comprising the indicator and a bit indicating the presence of the indicator. For example, the first bit may be used to indicate the presence of the indicator. FIG. 5 illustrates a schematic diagram 500 illustrating a MAC PDU for CG based SDT according to embodiments of the present disclosure. As shown in FIG. 5, reference sign 510 denotes an example of an MAC PDU. The MAC PDU comprises a MAC subPDU 511 which comprises only a MAC subheader. Reference sign 520 denotes an example of the MAC subheader for 4 bits backoff indicator. In this example, B field 521 indicates the presence of a backoff indicator, R fields 522 denote reserved bits, and BI filed 523 indicates the backoff indicator. For example, B field 521 may be set to "1" indicating the presence of a backoff indicator field in the subheader. Of course, B field 511 may also be set to any other suitable value to indicate the presence of a backoff indicator field in the subheader.

Reference sign 530 denotes an example of the MAC subheader for 5 bits backoff indicator. In this example, B field 531 indicates the presence of a backoff indicator, R fields 532 denote reserved bits, and BI filed 533 indicates the backoff indicator. For example, B field 531 may be set to "1" indicating the presence of a backoff indicator field in the subheader. Of course, B field 531 may also be set to any other suitable value to indicate the presence of a backoff indicator field in the subheader.

Figure 6:
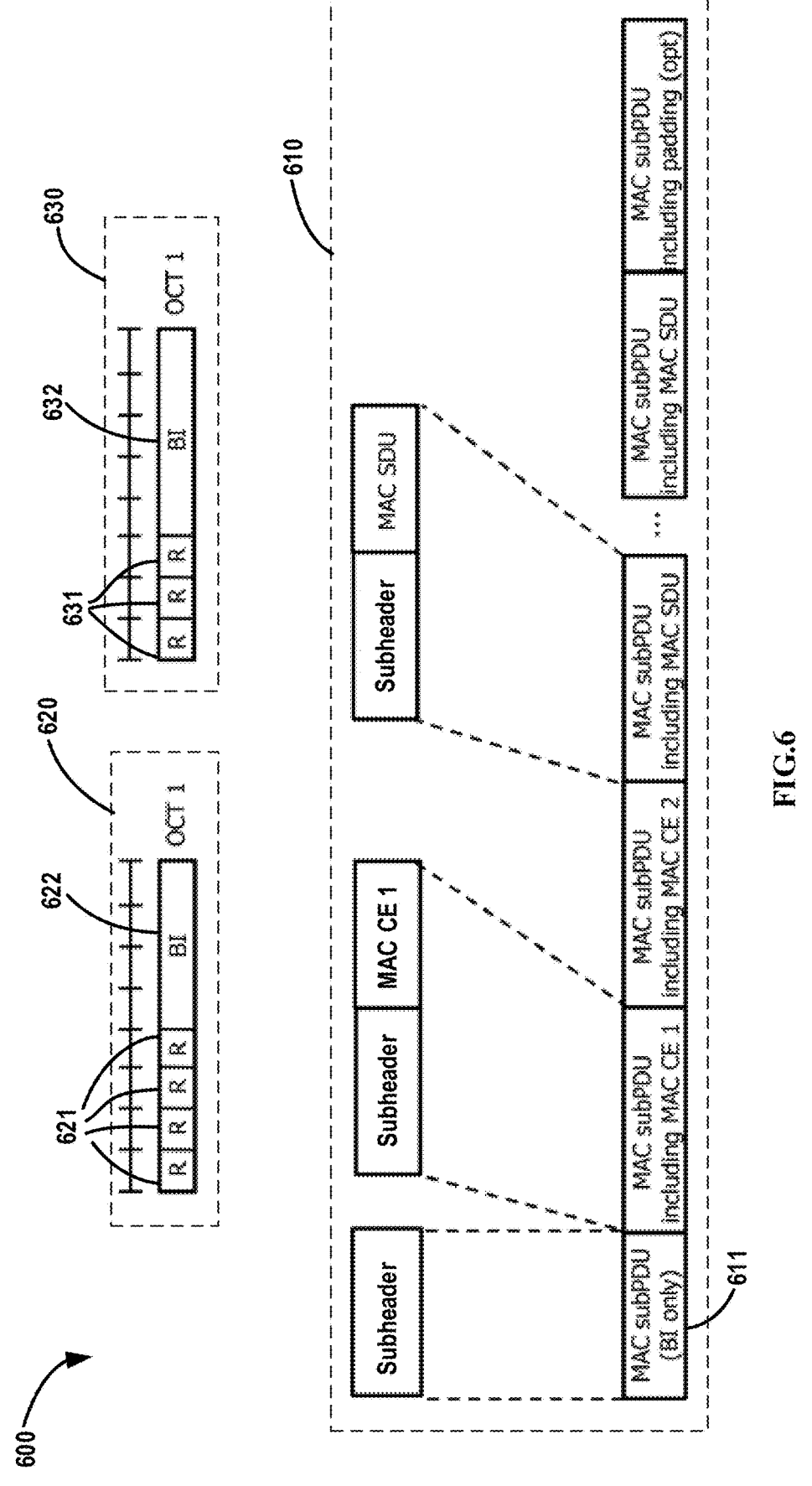
FIG. 6 illustrates a schematic diagram illustrating a MAC PDU for CG based SDT according to embodiments of the present disclosure.

In some alternative embodiments, the indicator may be comprised in a predetermined byte of the MAC PDU. For example, the indicator may be comprised in the first byte of the MAC PDU. FIG. 6 illustrates a schematic diagram 600 illustrating a MAC PDU for CG based SDT according to embodiments of the present disclosure. As shown in FIG. 6, reference sign 610 denotes an example of the MAC PDU. The MAC PDU comprise a MAC subPDU 611 which comprises only a MAC subheader carrying the indicator. Reference sign 620 denotes an example of the MAC subheader for 4 bits backoff indicator. In this example, R fields 621 denote reserved bits, and BI filed 622 indicates the backoff indicator. Reference sign 630 denotes an example of the MAC subheader for 5 bits backoff indicator. In this example, R fields 631 denote reserved bits, and BI filed 632 indicates the backoff indicator.

In this way, the terminal device 110 can obtain the indicator for a duration of the third timer. Return to FIG. 2C, then the terminal device 110 can determine 229 the duration of the third timer based on the indicator. In some embodiments, the terminal device 110 may get a maximum backoff value corresponding to a value (also referred to as a first value) comprised in the indicator based on a predefined table. An example of the predefined table is shown below in Table 1. It is merely an example, and does not make limitation for the present disclosure.

TABLE 1

| An example of Backoff Parameter values | |
|---|---|
| Index | Backoff Parameter value (ms) |
| 0 | 5 |
| 1 | 10 |
| 2 | 20 |
| 3 | 30 |
| 4 | 40 |
| 5 | 60 |

TABLE 1-continued

| An example of Backoff Parameter values | |
| --- | --- |
| Index | Backoff Parameter value (ms) |
| 6 | 80 |
| 7 | 120 |
| 8 | 160 |
| 9 | 240 |
| 10 | 320 |
| 11 | 480 |
| 12 | 960 |
| 13 | 1920 |

In some embodiments, the terminal device 110 may select a value according to a uniform distribution between zero and the maximum backoff value, and take the selected value as the duration of the third timer. In some embodiments, the backoff parameter values in Table 1 may also be extended as shown in Table 2.

TABLE 2

| An example of extended Backoff Parameter values | |
| --- | --- |
| Index | Backoff Parameter value (ms) |
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | 3840 |
| 15 | 7680 |
| 16 | 15360 |
| 17 | 30720 |
| 18 | 61440 |
| 19 | 122880 |
| 20 | 245760 |
| 21 | 491520 |
| 22-31 | reserved |

In some embodiments, the terminal device 110 may determine a second value between zero and the first value comprised in the indicator, and determine the duration of the third timer based on the second value and a periodicity of the CG. For example, the backoff indicator is an integer N. The terminal device 110 may select a random integer value n according to uniform distribution between 0 and the first value. The resulting duration is n*periodicity of the CG. In this way, shared CG based SDT on the corresponding CG resource is not allowed for the next n CG transmission occasion.

In some embodiments, the backoff indicator may not be obtained by the terminal device 110. In these embodiments, the terminal device 110 may set the duration of the third timer as 0.

In this way, the contention between multiple terminal devices for the next CG occasion can be alleviated.

It should be note that actions shown in FIGS. 2A to 2C are not always necessary for implementing embodiments of the present disclosure, and more or less actions may be adapted as needed.

Example Implementation of Methods

Embodiments of the present disclosure provide methods of communication implemented at a terminal device and a network device. These methods will be described below with reference to FIGS. 7 to 8.

FIG. 7 illustrates an example method 700 of communication implemented at a terminal device in accordance with some embodiments of the present disclosure. For example, the method 700 may be performed at the terminal device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard. In this example, assuming that the terminal device 110 decides to transmit uplink data in an inactive state.

At block 710, the terminal device 110 determines a CG from a configuration of BWP for the transmission of the uplink data in the inactive state. In some embodiments, the terminal device 110 may obtain the configuration from system information or from a dedicated message received from the network device 120, and determine the CG from the configuration. In some embodiments, the terminal device 110 may determine a set of candidates for the CG from the configuration, and determine the CG from the set of candidates.

At block 720, the terminal device 110 transmits, in the inactive state, the uplink data to the network device 120 based on the CG. In some embodiments, the terminal device 110 may further transmit, to the network device 120, a MAC CE comprising a short I-RNTI of the terminal device 110.

In this way, traffic load on the initial BWP can be alleviated.

In some embodiments, the terminal device 110 may determine, from system information received from the network device 120, whether a full I-RNTI of the terminal device 110 is to be used. If determining that the full I-RNTI is to be used, the terminal device 110 may further transmit, to the network device 120, a first MAC CE comprising the full I-RNTI. If determining that the full I-RNTI is not to be used, the terminal device 110 may further transmit, to the network device 120, a second MAC CE comprising a short I-RNTI.

In this way, RRC-less can be supported for CG based SDT.

In some embodiments, the terminal device 110 may start a first timer upon the transmission of the uplink data, the first timer being used for monitoring a downlink control channel. In these embodiments, if receiving a scheduling for retransmission of the uplink data, the terminal device 110 may restart the first timer.

In some embodiments, the terminal device 110 may receive, from the network device 120, an indication indicating whether the transmission is successful or failed upon expiration of the first timer. If the indication indicates that the transmission is successful upon expiration of the first timer, the terminal device 110 may determine that the transmission is successful upon expiration of the first timer. If the indication indicates that the transmission is failed upon expiration of the first timer, the terminal device 110 may determine that the transmission is failed upon expiration of the first time.

In some embodiments, the terminal device 110 may stop the first timer upon receipt of a MAC PDU, the MAC PDU indicating that the uplink data is transmitted successfully.

In this way, downlink control channel monitoring after CG transmission can be performed.

In some embodiments, the terminal device 110 may start a second timer for a contention resolution upon the transmission of the uplink data. In some embodiments, if determining that the second timer expires, the terminal device 110 may determine that the contention resolution is unsuccessful.

In some embodiments, if receiving a MAC PDU from the network device 120, the terminal device 110 may determine whether the MAC PDU comprises a first identity associated with the contention resolution. If determining that the MAC PDU comprises the first identity, the terminal device 110 may determine whether the first identity matches a second identity of the terminal device in the transmission of the uplink data. If determining that the first identify matches the second identity, the terminal device 110 may determine that the contention resolution is successful, and determine that the transmission of the uplink data is successful.

In some embodiments, the terminal device 110 may stop the second timer upon receipt of the MAC PDU. In some embodiments, in accordance with a determination that the transmission of the uplink data is successful, the terminal device 110 may determine a TA command from the MAC PDU and perform the TA command. In some embodiments, the terminal device 110 may also receive, in the MAC PDU from the network device 120, a C-RNTI for the terminal device 110.

In some embodiments, if determining that the MAC PDU does not comprise the first identity or the first identity mismatches the second identity, the terminal device 110 may discard the MAC PDU, and determine that the contention resolution is unsuccessful.

In some embodiments, if determining that the contention resolution is unsuccessful, the terminal device 110 may determine that the transmission of the uplink data is unsuccessful. In some alternative embodiments, if determining that the contention resolution is unsuccessful, the terminal device 110 may retransmit the uplink data in the inactive state; and restart the second timer; and if determining that the number of transmission is equal to a predetermined number, the terminal device 110 may determine that the transmission of the uplink data is unsuccessful.

In this way, contention resolution mechanism for CG based SDT can be achieved.

In some embodiments, if determining that the contention resolution is unsuccessful, the terminal device 110 may start a third timer, suspend the transmission of the uplink data on the CG until the third timer expires, and perform the transmission of the uplink data based on the CG in the inactive state after the third timer expires.

In some embodiments, the terminal device 110 may receive, from the network device 120, an indicator for a duration of the third timer, determine the duration of the third timer based on the indicator, and start the third timer with the duration. In some alternative embodiments, the terminal device 110 may receive, from the network device 120, a RRC message comprising the indicator, and obtain the indicator from the RRC message.

In some embodiments, the terminal device 110 may determine a second value between zero and a first value comprised in the indicator, and determine the duration of the third timer based on the second value and a periodicity of the configured grant.

In some embodiments, the terminal device 110 may receive, from the network device 120, a MAC PDU comprising the indicator, and obtain the indicator from the MAC PDU. In some embodiments, the terminal device 110 may determine, from the MAC PDU, a header comprising a LCID for the indicator, and determine the indicator from a MAC CE corresponding to the header. In some alternative embodiments, the terminal device 110 may determine, from the MAC PDU, a header comprising a bit that indicates the presence of the indicator, and determine the indicator from the header. In some alternative embodiments, the terminal device 110 may determine the indicator from a predetermined byte of the MAC PDU.

In this way, a backoff mechanism in case of contention can be achieved, and the contention between multiple terminal devices for the next CG occasion can be alleviated.

FIG. 8 illustrates an example method 800 of communication implemented at a network device in accordance with some embodiments of the present disclosure. For example, the method 800 may be performed at the network device 120 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

As shown in FIG. 8, at block 810, the network device 120 transmits a configuration of BWP for transmission of uplink data from the terminal device 110 in an inactive state, the configuration comprising a CG. In some embodiments, the configuration may comprise a set of candidates for the CG. In some embodiments, the network device 120 may transmit the configuration in system information.

In some embodiments, the network device 120 may receive, from the terminal device 110, a MAC CE comprising a short I-RNTI of the terminal device 110. In some embodiments, the network device 120 may indicate, to the terminal device 110 and in system information, whether a full I-RNTI of the terminal device 110 is to be used. Upon the network device 120 indicates that the full I-RNTI is to be used, the network device 120 may receive, from the terminal device 110, a first MAC CE comprising the full I-RNTI. Upon the network device 120 indicates that the full I-RNTI is not to be used, the network device 120 may receive, from the terminal device 110, a second MAC CE comprising a short I-RNTI.

In some embodiments, the network device 120 may transmit, to the terminal device 110, an indication indicating whether the transmission of the uplink data is successful or failed upon expiration of a first timer. In these embodiments, the first timer is used for monitoring of a downlink control channel. In some embodiments, the network device 120 may transmit a MAC PDU to the terminal device 110, the MAC PDU indicating that the uplink data is transmitted successfully. In some embodiments, the network device 120 may transmit, to the terminal device 110, a scheduling for retransmission of the uplink data.

In some embodiments, the network device 120 may transmit a MAC PDU to the terminal device 110, the MAC PDU comprising a first identity associated with a contention resolution. In some embodiments, the network device 120 may also transmit a TA command to the terminal device 110 in the MAC PDU. That is, the MAC PDU may further comprise the TA command. In some embodiments, the network device 120 may also transmit a C-RNTI for the terminal device 110 in the MAC PDU. That is, the MAC PDU may further comprise the C-RNTI. In some embodiments, one or more of the first identity, the TA command and the C-RNTI may be transmitted in the same MAC CE. In some embodiments, the first identity, the TA command and the C-RNTI may be respectively transmitted in a separate MAC CE.

In some embodiments, the network device 120 may transmit, to the terminal device 110, an indicator for a duration of a third timer. In these embodiments, the third timer is used for suspending of the transmission of the uplink data on the CG. In some embodiments, the network device 120 may transmit the indicator in a RRC message. In some alternative embodiments, the network device 120 may transmit the indicator in a MAC PDU.

In some embodiments, the MAC PDU may comprise a header comprising a LCID and a MAC CE carrying the indicator. In some alternative embodiments, the MAC PDU may comprise a header comprising the indicator and a bit indicating the presence of the indicator. In some alternative embodiments, the indicator is comprised in a predetermined byte of the MAC PDU.

The implementations of the methods described in FIGS. 7 to 8 substantially correspond to the processes described in connection with FIGS. 2A to 2C, and thus other details are not repeated here.

Example Implementation of Device

Figure 9:
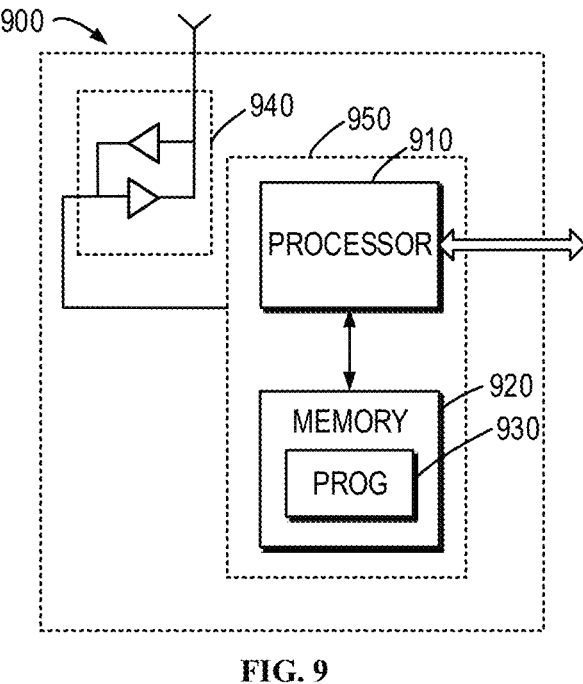
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the terminal device 110 or the network device 120 as shown in FIG. 1. Accordingly, the device 900 can be implemented at or as at least a part of the terminal device 110 or the network device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device

900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2A to 2C and FIGS. 7 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:
   performing a transmission for Configured Grant (CG) based Small Data Transmission (SDT);
   starting a first timer and a second timer when the transmission for the CG based SDT is performed;
   performing retransmission for the CG based SDT in a case where the first timer is not running; and
   monitoring a control channel while the second timer is running.

2. The method of claim 1, further comprising:
   restarting the first timer when the retransmission for the CG based SDT is performed.

3. The method of claim 1,
   wherein the control channel is a Physical Downlink Control Channel (PDCCH) addressed to Configured Scheduling Radio Network Temporary Identifier (CS-RNTI) and Cell-RNTI (C-RNTI).

4. The method of claim 3, further comprising:
   stopping the first timer upon reception of the PDCCH addressed to either the C-RNTI or the CS-RNTI.

5. The method of claim 3, further comprising:
   stopping a configured Grant Timer upon reception of the PDCCH addressed to the C-RNTI.

6. The method of claim 1, further comprising:
   starting a configured Grant Timer; and
   upon expiration of the configured Grant timer, determining that the CG based SDT has failed.

7. A method of communication performed by a network device, the method comprising:
   receiving, from a terminal device, a transmission for Configured Grant (CG) based Small Data Transmission (SDT), wherein a first timer and a second timer are started when the transmission is performed;
receiving, from the terminal device, retransmission for the CG based SDT in a case where the first timer is not running; and
transmitting a control channel to the terminal device,
wherein the control channel is monitored by the terminal device while the second timer is running.

8. The method of claim 7, wherein the first timer is restarted when the retransmission for the CG based SDT is performed.

9. The method of claim 7,
   wherein the control channel is a Physical Downlink Control Channel (PDCCH) addressed to Configured Scheduling Radio Network Temporary Identifier (CS-RNTI) and Cell-RNTI (C-RNTI).

10. The method of claim 9, wherein the first timer is stopped upon the PDCCH addressed to either the C-RNTI or the CS-RNTI being received by the terminal device.

11. The method of claim 9, wherein a configured Grant Timer is stopped upon the PDCCH addressed to the C-RNTI being received by the terminal device.

12. The method of claim 7, wherein a configured Grant Timer is started by the terminal device, and upon expiration of the configured Grant timer, the CG based SDT is determined to have failed.

13. A terminal device, comprising:
   at least one computer readable memory configured to store program instructions; and
   at least one processor that when executing the program instructions perform operations comprising:
   a transmission for Configured Grant (CG) based Small Data Transmission (SDT);
   starting a first timer and a second timer when the transmission is performed; and
   performing retransmission for the CG based SDT in a case where the first timer is not running; and
   monitoring a control channel while the second timer is running.

14. The terminal device of claim 13, wherein the at least one processor further performs operations comprising:
   restarting the first timer when the retransmission for the CG based SDT is performed.

15. The terminal device of claim 13, wherein
   the control channel is a Physical Downlink Control Channel (PDCCH) addressed to Configured Scheduling Radio Network Temporary Identifier (CS-RNTI) and Cell-RNTI (C-RNTI).

16. The terminal device of claim 15, wherein the at least one processor further performs operations comprising:
   stopping the first timer upon reception of the PDCCH addressed to either the C-RNTI or the CS-RNTI.

17. The terminal device of claim 15, wherein the at least one processor further performs operations comprising:
   stopping a configured Grant Timer upon reception of the PDCCH addressed to the C-RNTI.

18. The terminal device of claim 13, wherein the at least one processor further performs operations comprising:
   starting a configured Grant Timer; and
   upon expiration of the configured Grant timer, determining that the CG based SDT has failed.

* * * * *